United States Patent [19]
Hirt et al.

[11] 3,712,785
[45] Jan. 23, 1973

[54] MOLDING MACHINE

[75] Inventors: Wilhelm Hirt, Norf Rhine; Heinz Ringelmann, Nievenheim; Ernst Weckesser, Grevenbroich; Weinhold Gottfried, Norf Rhine, all of Germany

[73] Assignee: Vereinigte Aluminium Werke Aktiengesellschaft, Bonn, Germany

[22] Filed: Feb. 4, 1971

[21] Appl. No.: 112,656

Related U.S. Application Data

[62] Division of Ser. No. 852,730, Aug. 25, 1969, abandoned.

[30] Foreign Application Priority Data

Sept. 4, 1968 Germany..................P 17 58 927.4

[52] U.S. Cl. ................425/405, 425/412, 425/420, 425/421, 425/431, 425/425, 425/432, 264/71, 264/102

[51] Int. Cl. ...........................................B30b 11/02

[58] Field of Search ......18/16 R, 16.5, 16.7; 25/41 J; 264/29, 69, 72, 71, 22, 23, 102, DIG. 3; 425/405, 812

[56] References Cited

UNITED STATES PATENTS

| | | | |
|---|---|---|---|
| 2,321,277 | 6/1943 | Boyle | 264/72 |
| 3,126,430 | 3/1964 | Price | 264/102 X |
| 3,517,092 | 6/1970 | Peterson | 264/29 |
| 3,156,011 | 11/1964 | Olson | 18/16 R |
| 3,548,456 | 12/1970 | Boesch et al. | 18/16.5 |
| 3,129,463 | 4/1964 | Gill et al. | 25/41 J X |
| 1,654,046 | 12/1927 | Kahl | 264/102 X |
| 2,088,422 | 7/1937 | Kemmer | 264/102 X |
| 2,384,215 | 9/1945 | Toulmin | 18/DIG. 33 |
| 2,353,492 | 7/1944 | O'Connor | 25/41 J X |
| 2,545,029 | 3/1951 | Hemb | 25/41 J X |
| 3,555,599 | 1/1971 | Weinhold | 25/41 J X |
| 2,959,900 | 11/1960 | Wollett | 18/16 R X |
| 3,279,021 | 10/1966 | Pratt et al. | 18/16 R X |
| 3,421,991 | 1/1969 | Hildebrandt | 264/29 X |
| 3,526,686 | 9/1970 | Weinhold | 264/71 |
| 3,548,455 | 12/1970 | Holmquist | 18/16.5 X |
| 3,245,119 | 4/1966 | Huddleston | 18/16 R |
| 3,266,095 | 8/1966 | Levey et al. | 18/16 R |

*Primary Examiner*—J. Howard Flint, Jr.
*Attorney*—Michael S. Striker

[57] ABSTRACT

A molding device in which particulate material contained therein on a vibrating table is vibrated thereby and is simultaneously compacted by a weight. The molding device is hermetically sealed and coupled to a source of vacuum operative to evacuate the device and to remove gas particles from between the interstices of the particulate material.

8 Claims, 2 Drawing Figures

MOLDING MACHINE

CROSS-REFERENCE TO RELATED APPLICATION

This application is a division of our co-pending application Ser. No. 852,730, filed Aug. 25, 1969 and entitled "Molding Machine," and now abandoned.

BACKGROUND OF THE INVENTION

The present invention relates to an apparatus for compacting particulate material into a body of predetermined shape and great density, especially for the manufacture of carbon electrodes for the production of aluminum.

In many fields of application for molded or compacted bodies from particulate material, it is desirable that such bodies have a minimum of pores or free spaces, i.e., that they have as high a density as possible. This particularly applies to carbon blocks and pre-heat treated electrode material for the production of aluminum. Moreover, the quality of, for example, pre-heat treated anodes used for the electrolytic aluminum production, depends to a great extent on the degree of density and porosity of such anodes. The greater the density and the lesser the porosity, the more resistance such anodes have against the effects of gases resulting from the electrolysis and the lesser the melting losses due to oxygen effects.

It is known, to produce carbon electrodes, and in particular carbon anodes used for the production of aluminum, with the help of stamping machines or presses.

Also known, is a molding technique in which the material to be molded is subjected to a jolting and compacting process. Such a process has a great many advantages over other known art molding processes. For example, it permits the molding of a great variety of differently shaped and dimensioned bodies in the same device, realizes a substantial uniformly compacted and end product and, in addition, offers the same application possibilities as a press or stamping machine, however, at a much greater economy.

Mold castings produced in accordance with the mentioned molding techniques have a porosity which, aside from other conditions, is the lesser the greater their "green density," i.e., the degree of their density existing before the molding process. The numerical value of the "green density" of such mold castings is dependent upon a number of factors, for example, the specific weight of the coke, the granular structure of the material, the nature and the fusion point of the binding material and the processing temperature of the raw material.

In addition, the particular molding process applied, i.e., stamping, pressing or jolting, has a direct and decisive effect on the "green bodies."

On the whole, and as regards the molding process, the free spaces or pores intermediate the discrete particles of the "green material" to be compacted, should, with the help of from exteriorly directed forces, be changed such that a matrix results with the highest density possible.

With the above-mentioned molding and compacting processes and during application of the same, a part of the gases contained within the "green masses," as well as part of the vapors of the binding material contained in these masses are expelled therefrom, however, a considerable amount of these gases and vapors remains and is entrapped between the interstices of the material and settled therein in the form of discrete bubbles which renders a maximum compacting of the "green material" impossible.

SUMMARY OF THE INVENTION

An object of the present invention is to provide an apparatus for compacting particulate material into a body of great density, especially adapted for the electrolytic production of aluminum and which body, due to its great density, prevents excessive loss of its material during such aluminum production.

Such an apparatus according to the invention comprises means for confining particulate material in an upright hollow mold form of predetermined configuration and means for simultaneously subjecting the particulate material therein to vibrations and compacting by compacting means arranged in the mold form and adapted to engage the material at the upper surface thereof. In addition, means are provided to evacuate the mold form and to remove gases from between the interstices of the particulate material so as to obtain a maximum degree of density of the compacted material.

The novel features which are considered as characteristic of the invention are set forth in particular in the appended claims. The invention itself, however, as to it construction, together with additional objects and advantages thereof, will be best understood from the following description of specific embodiments when read in connection with the accompanying drawings.

DESCRIPTION OF THE PREFERRED EMBODIMENTS

Figure 1:
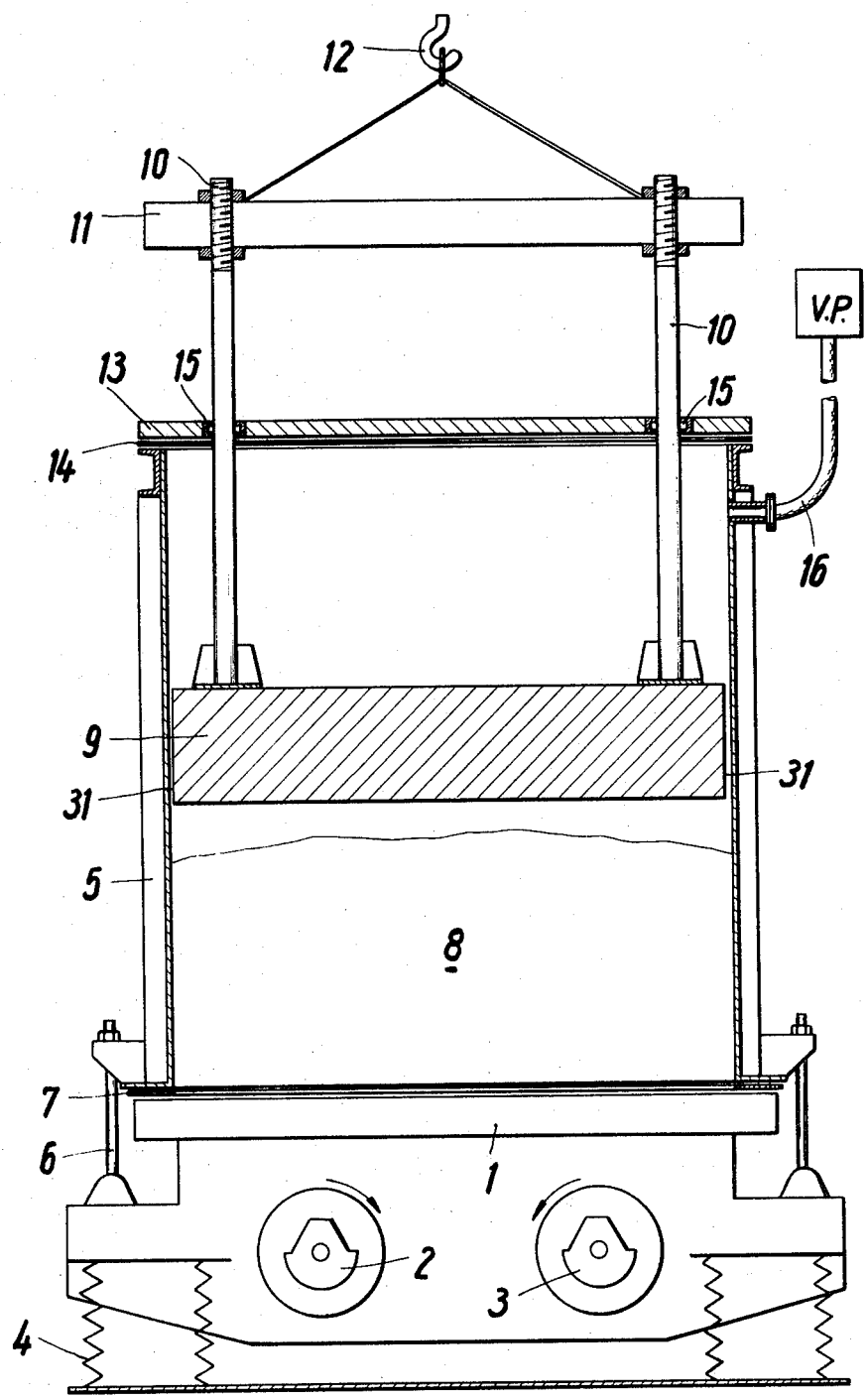
FIG. 1 is a cross-sectional view of a first embodiment of the molding apparatus according to the present invention.

Referring now to the drawings in which like reference numerals index like parts, the molding device as shown in FIG. 1 comprises a vibrating table 1, rotary unbalancer members 2 and 3 turnably mounted on table 1, which are rotated in opposite directions and oscillate the table 1, and support springs 4 on which the table 1 is resiliently mounted. A box or mold form 5 is fixedly mounted on the table 1 by means of bolt members 6 while a sealing strip 7 is sandwiched intermediate the box 5 and the table 1.

Superimposed on the upper surface of the sealing strip 7 may be arranged a convention matrix in which latter case the box 5 rests with its open lower end upon the matrix. The box 5 is seen to comprise a hollow interior to be filled in part with hot green material 8. Transversely introduced into the interior by a cross-beam 11 via elongated rods 10 is a cover weight 9 adapted to engage the material 8 at the upper surface thereof for subjecting the material to pressure. The weight 9 is fixedly mounted on the rods 10 which in turn are fixedly secured to cross-beam 11 and the latter being arranged to be suspended by a lifting hook 12 so as to enable removal of the weight assembly from the device. Disposed at the open end of the box 5 during operation of the device is a sealing plate 13 hermetically sealing the interior of the box from the atmosphere. As shown, the sealing plate 13 is located intermediate the weight 9 and the cross-beam 11 and is reciprocable relative to the elongated pipes 10. Prior to introduction of the weight 9 into the interior of the box 5, the sealing plate 13 rests upon the upper region of the weight 9. Upon introduction of the weight 9 into the box 5, the sealing plate 13 engages the upper edge of the open top of box 5 and by means of a sealing joint ring 14 hermetically closes the box 5. The rods 10 extend in a sealed manner through openings formed in the sealing plate 13.

The hollow interior of the box 5 is connected to a vacuum pump VP via a hose 16. In this manner gas particles entrapped between the interstices of the material 8 as well as further gas contained within the interior of the box 5, is expelled therefrom. As shown clearances 31 are provided between opposite peripheral portions of the mold form 5 and the weight 9 to permit passage of air.

Figure 2:
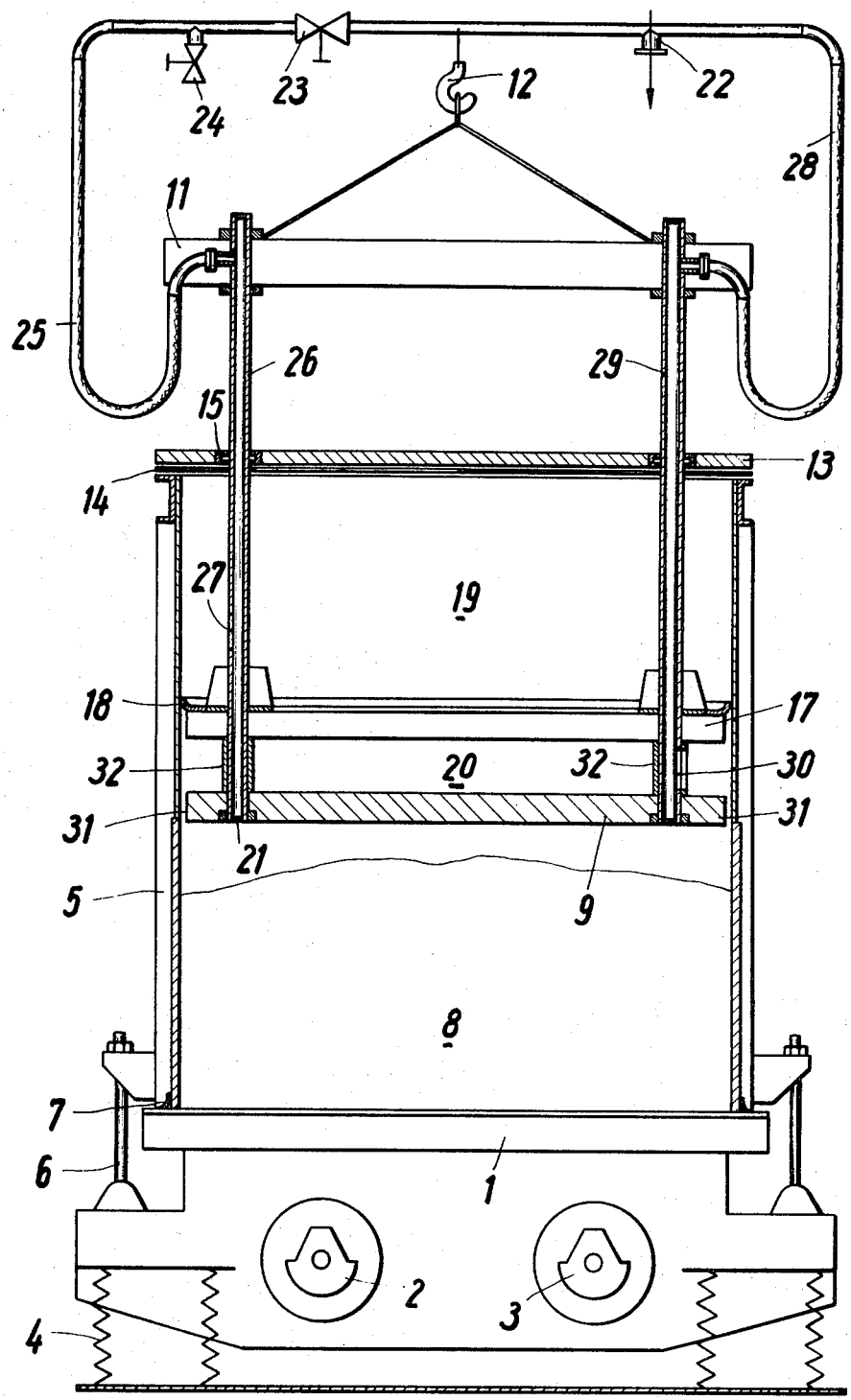
FIG. 2 is a cross-sectional view of a second embodiment of a molding apparatus according to the present invention.

The embodiment shown in FIG. 2 illustrates the manner in which the hollow interior is divided into an upper and a lower isolated pressure and vacuum chamber 19 and 20, respectively, by means of an additional sealing plate 17. The sealing plate 17 includes a sealing strip 18 which along the peripheral portions of the plate 17 sealingly but slidably engages the inner periphery of the box 5. The sealing plate is fixedly interconnected with the weight 9 by means of connector pieces 32.

As shown, the elongated pipes 26 and 29 extend through tee sealing plate 17 via opening 17a defined therethrough. Prior to introduction into the interior of box 5, this additional sealing plate 17 in the region of its upper surfaces engages the sealing plate or box cover 13 which rests thereon. Upon admitting particulate material 8 into the box 5 and introduction therein of the weight 9 and sealing plate 17, the plate 13 hermetically seals the interior of box 5 against the atmosphere. Thereupon, the chamber 19 is initially evacuated by means of a source of vacuum 22, a valve 23 which is in open position, a flexible conduit 25, a passage defined through pipe 26 and the port 27. The chamber 20 in essence is seen to consist of a still further chamber 21 and is in constant communication therewith via clearances 31 formed between the periphery of weight 9 and the inner wall periphery of box 9. The chambers 20 and 21 are interconnected with and evacuated by the source of vacuum 22 via the flexible conduit 28, the pipe 29 and the port 30 opening into the chamber 20 intermediate the sealing plate 17 and the weight 9. Upon creating an overall partial vacuum of for example 50 mm Hg CO°c in the chambers, the weight is brought into engagement with the upper surface of the particulate material 8 and under vibration by the unbalancers 2 and 3, the material is being compacted by the weight 9.

Upon substantial compacting of the material, the valve member 23 is closed and an air admitting valve 24 is opened to permit the entry of air into the upper chamber 19 to restore atmospheric pressure therein. As a result, additional pressure is exerted on the upper surface of the sealing plate 17 which pressure via the connector pieces 32, is transmitted to the weight 9 which, in turn, increases its pressure on the material 8.

It is self-evident, that the strength of this additional pressure is directly determined by the size of the upper surface of the sealing plate 17. Further compacting of the material 8, at this time, results in a greater density of material compacted.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Apparatus for compacting particulate material into a body of great density, especially for the manufacture of carbon electrodes for the production of aluminum, comprising a vibrating table having an upper surface; rotary unbalancing means mounted on said table and operative during rotation thereof to oscillate said vibrating table; spring means supporting said vibrating table and said rotary unbalancing means; an upright hollow mold form arranged on said upper surface of said vibrating table and having an upper open end for partially filling said mold form with particulate material to be compacted; a cover plate removably connected to and air-tightly closing said upper open end of said mold form; compacting means comprising a plate-shaped weighted member extending transversely through said mold form and being movable therein in vertical direction, said plate shaped weighted member having peripheral portions defining a clearance with peripheral portions of said mold form; means communicating with the interior of said mold form between said cover plate and said plate-shaped weighted member for applying through said clearance a vacuum to the particulate material for evacuating gases from between the interstices of the particulate material; and means for lifting said plate-shaped weighted member and said cover plate and comprising a pair of parallel transversely spaced portions extending slidingly and in sealed manner through said cover and being each connected at one end with said plate-shaped weighted member and at the other end thereof to said lifting means.

2. Apparatus as defined in claim 1, wherein said mold form has a lower open end and wherein a mold pattern is provided intermediate said upper surface of said vibrating table and said lower open end of said mold form.

3. Apparatus as defined in claim 1, and including sealing means intermediate said cover plate and said plate-shaped weighted member, said sealing means interconnected parallel and in spaced relation with said plate-shaped weighted member and movable therewith in said mold form by means of said lifting means.

4. Apparatus as defined in claim 3, wherein said sealing means defines a first and a second vacuum chamber within said mold form intermediate said top and bottom thereof, and wherein said gas-evacuating means selectively communicates with said first and second vacuum chambers.

5. Apparatus as defined in claim 4, wherein said sealing means is a plate-shaped member having peripheral portions thereof sealingly engaging inner peripheral portions of said mold form and wherein said elongated portions of said lifting means include first and second passageways, said first passageway communicating said first vacuum chamber with said gas evacuating means and said second passageway communicating said second vacuum chamber with said gas evacuating means.

6. Apparatus as defined in claim 5, wherein said gas evacuating means comprises a source of vacuum and conduit means interconnecting said first and second passageways with said source of vacuum.

7. Apparatus as defined in claim 6, and including valve means in said conduit means for selectively connecting said source of vacuum with said first and second vacuum chambers.

8. Apparatus as defined in claim 6, and including additional valve means in said conduit means for selectively connecting said first vacuum chamber with the outer atmosphere.

* * * * *